(12) United States Patent
Kolade

(10) Patent No.: US 9,896,359 B2
(45) Date of Patent: Feb. 20, 2018

(54) CHEMICAL TREATMENT FOR ORGANIC FOULING IN BOILERS

(71) Applicant: CONOCOPHILLIPS COMPANY, Houston, TX (US)

(72) Inventor: Babajide Kolade, Tulsa, OK (US)

(73) Assignee: ConocoPhillips Company, Houston, TX (US)

( * ) Notice: Subject to any disclaimer, the term of this patent is extended or adjusted under 35 U.S.C. 154(b) by 502 days.

(21) Appl. No.: 14/303,747

(22) Filed: Jun. 13, 2014

(65) Prior Publication Data

US 2014/0367095 A1 Dec. 18, 2014

Related U.S. Application Data

(60) Provisional application No. 61/834,484, filed on Jun. 13, 2013.

(51) Int. Cl.
| | |
|---|---|
| C02F 5/08 | (2006.01) |
| C02F 5/10 | (2006.01) |
| E21B 43/20 | (2006.01) |
| E21B 43/24 | (2006.01) |
| E21B 21/06 | (2006.01) |
| C09K 8/52 | (2006.01) |
| C02F 1/68 | (2006.01) |
| C02F 5/02 | (2006.01) |
| E21B 43/00 | (2006.01) |
| E21B 21/00 | (2006.01) |
| C02F 1/00 | (2006.01) |
| C09K 8/02 | (2006.01) |
| C09K 8/68 | (2006.01) |
| C02F 101/30 | (2006.01) |

(52) U.S. Cl.
CPC ............... *C02F 1/683* (2013.01); *C02F 5/10* (2013.01); *E21B 43/2408* (2013.01); *C02F 2101/30* (2013.01); *C02F 2303/22* (2013.01)

(58) Field of Classification Search
None
See application file for complete search history.

(56) References Cited

U.S. PATENT DOCUMENTS

| | | |
|---|---|---|
| 4,433,727 A | 2/1984 | Argabright et al. |
| 5,414,062 A | 5/1995 | Lundquist |
| 5,512,183 A | 4/1996 | Boyette et al. |
| 8,951,467 B2 * | 2/2015 | Bedinger, III ......... C10G 75/02 134/18 |
| 2008/0026029 A1 | 1/2008 | Wellinghoff |
| 2008/0190607 A1 * | 8/2008 | Minnich ............. E21B 43/2408 166/267 |

(Continued)

FOREIGN PATENT DOCUMENTS

WO WO 2012008273 A1 * 1/2012 .............. C23F 11/08

OTHER PUBLICATIONS

International Search Report. PCT/US14/42301. dated Sep. 24, 2014.

*Primary Examiner* — Clare M Perrin
(74) *Attorney, Agent, or Firm* — ConocoPhillips Company

(57) ABSTRACT

Methods and systems relate to generating steam from water that contains dissolved organic compounds. The methods mix a polymerization inhibitor with the water prior to feeding the water into a steam generator. The polymerization inhibitor limits coupling of the dissolved organics under boiler conditions to mitigate fouling issues within the boiler.

18 Claims, 1 Drawing Sheet

(56) References Cited

U.S. PATENT DOCUMENTS

2009/0014180 A1    1/2009  Stegemeier et al.
2012/0168127 A1    7/2012  Abughazaleh
2013/0140493 A1*   6/2013  Mori .................. C23F 11/08
                                              252/392

* cited by examiner

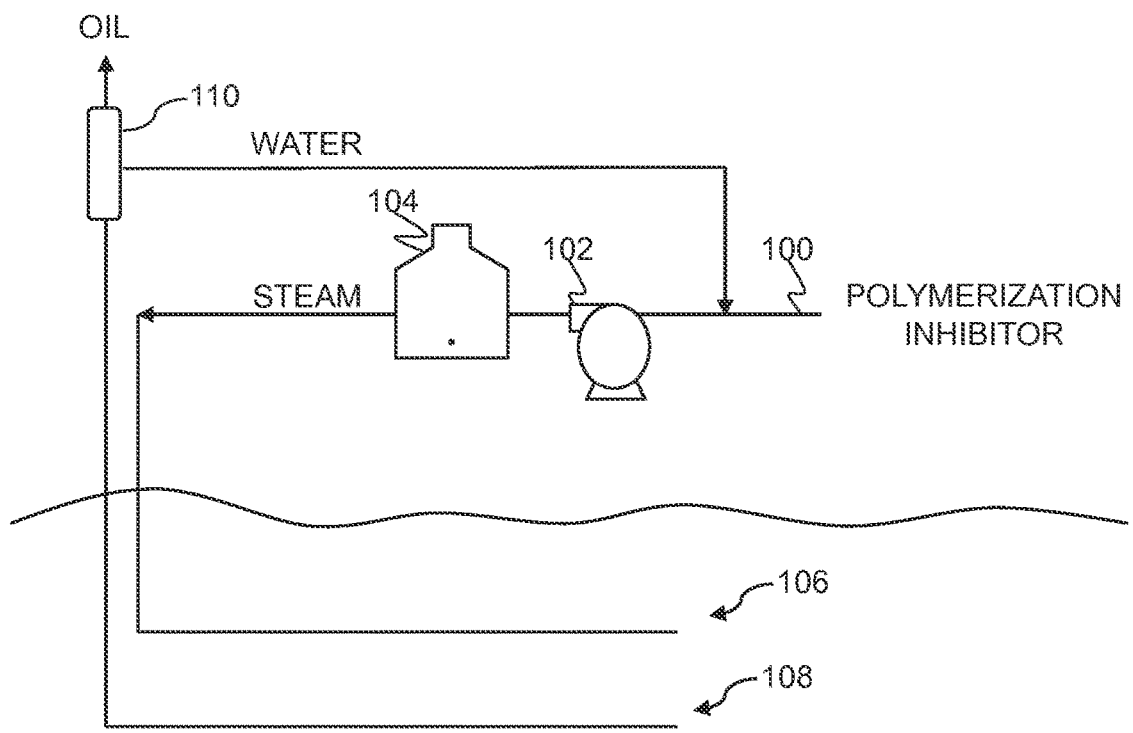

CHEMICAL TREATMENT FOR ORGANIC FOULING IN BOILERS

CROSS-REFERENCE TO RELATED APPLICATIONS

This application is a non-provisional application which claims benefit under 35 USC §119(e) to U.S. Provisional Application Ser. No. 61/834,484 filed Jun. 13, 2013, entitled "CHEMICAL TREATMENT FOR ORGANIC FOULING IN BOILERS," which is incorporated herein in its entirety.

STATEMENT REGARDING FEDERALLY SPONSORED RESEARCH

None.

FIELD OF THE INVENTION

Embodiments of the invention relate to limiting organic fouling while generating steam from water that may be recycled in thermal oil recovery processes.

BACKGROUND OF THE INVENTION

Several techniques utilized to recover hydrocarbons in the form of bitumen from oil sands rely on generated steam to heat and lower viscosity of the hydrocarbons when the steam is injected into the oil sands. One common approach for this type of recovery includes steam assisted gravity drainage (SAGD). The hydrocarbons once heated become mobile enough for production along with the condensed steam, which is then recovered and recycled.

Costs associated with building a complex, large, sophisticated facility to process water and generate steam contributes to economic challenges of oil sands production operations. Once through steam generators (OTSGs) often produce the steam. Even with extensive water treatment, fouling issues persist and are dealt with through mechanical cleaning of boiler tubes, which increases operating costs and results in a loss of steam production capacity that translates to an equivalent reduction in production.

Chemical additives introduced into the water provide one option for the treatment. For example, some known boiler anticorrosion compounds function by scavenging oxygen. Agents for only oxygen scavenging provide no added benefit if used in excess since dissolved oxygen removal fails to mitigate other fouling issues.

Therefore, a need exists for methods and systems for limiting organic fouling while generating steam from water that may be recycled in thermal oil recovery processes.

BRIEF SUMMARY OF THE DISCLOSURE

In one embodiment, a method of generating steam includes adding a polymerization inhibitor to feed water with a dissolved molecular oxygen concentration less than one part per million and dissolved organics. Supplying the feed water to a boiler produces the steam. The polymerization inhibitor limits coupling of the dissolved organics under boiler conditions.

For one embodiment, a method of generating steam includes adding to feed water an oxygen scavenging agent and a polymerization inhibitor different from the oxygen scavenging agent. The feed water contains dissolved organics capable of coupling under boiler conditions resulting in fouling deposition in the boiler without the polymerization inhibitor. Supplying the feed water mixed with the oxygen scavenging agent and the polymerization inhibitor to a boiler produces the steam.

BRIEF DESCRIPTION OF THE DRAWINGS

A more complete understanding of the present invention and benefits thereof may be acquired by referring to the following description taken in conjunction with the accompanying drawings in which:

FIG. 1 is a schematic of a production system for steam assisted oil recovery utilizing a polymerization inhibitor additive, according to one embodiment of the invention.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Methods and systems relate to generating steam from water that contains dissolved organic compounds. The methods mix a polymerization inhibitor with the water prior to feeding the water into a steam generator. The polymerization inhibitor limits coupling of the dissolved organics under boiler conditions to mitigate fouling issues within the boiler.

FIG. 1 illustrates an exemplary system that includes a boiler feed antifouling agent injector 100, a pump 102, a steam generator 104, such as a once-through steam generator (OTSG), an injection well 106, a production well 108, and a separator 110. While illustrated in an exemplary SAGD configuration, other techniques, such as cyclic steam stimulation, solvent assisted SAGD, steam drive or huff and puff, may employ the steam generated as described herein. The injection well 106 extends in a horizontal direction and above the production well 108 also extending in the horizontal direction.

In operation, the steam enters the formation along the injection well 106 forming a steam chamber with heat transferred from the steam to the oil or bitumen in the formation. The oil once heated becomes less viscous and mobile enough for flowing by gravity along with condensate of the steam to the production well 108. A mixture of the condensate and oil collected in the production well 108 flows to surface where the oil to be sold is removed in the separator 110 from the condensate, which is recycled for generating additional steam to sustain steam injection.

The water that is recycled even with treatment contains dissolved organic compounds believed to contribute to fouling in the steam generator 104. For example, phenolic compounds and other oxygenated hydrocarbons in the water may couple and/or polymerize under conditions in the steam generator 104. Any of these polymerized compounds that drop out of solution may foul the steam generator 104 and may undergo coking reactions further contributing to deposition in the steam generator 104. The antifouling agent injector 100 therefore adds a polymerization inhibitor to the water prior to the water entering the steam generator 104.

Lab tests showed that phenols (1000 parts per million) dissolved in water polymerized under boiler conditions to form polyaromatic compounds that would foul equipment. In some embodiments, the polymerization inhibitor selected thus reacts with one of oxygen and hydroxyl radicals of the dissolved organics to limit such coupling. The polymerization inhibitor may react with and break down dissolved organic species to produce gases.

In some embodiments, the water that the polymerization inhibitor is mixed with contains less than one part per million dissolved molecular oxygen. An oxygen scavenging agent added to the water may facilitate removal of the dissolved molecular oxygen and may be different than the polymerization inhibitor. The polymerization inhibitor may also scavenge oxygen and is thus added at a sufficient dose to remove initial dissolved molecular oxygen and be effective to limit the coupling of the dissolved organics. For some embodiments, the polymerization inhibitor mixes with the feed water that is without dissolved molecular oxygen.

Examples of the polymerization inhibitor include a hydroxylamine, an amino-urea, methyl-ethylketoxime, hydroquinone, erythorbate and combinations thereof. Relative to the lab tests without use of the polymerization inhibitor, additional lab tests showed at least a reduction in polymerization of phenols when the phenols (1000 parts per million) dissolved in water were mixed with diethylhydroxylamine or carbohydrazide prior to such resulting mixture being subjected to the same boiler conditions. Degree of discoloration of samples following the tests confirmed effectiveness of the polymerization inhibitor as the sample without the polymerization inhibitor was darker due to larger polyaromatic compounds being formed. A gas chromatography-mass spectrometry (GCMS) method was used to identify and quantify phenolic species present in samples following the test. Relative concentrations of polymerized phenolic species were used to calculate extent of polymerization and evaluate the effectiveness of inhibitors. Extents of polymerization for the test duration without an inhibitor, with diethylhydroxylamine, and with carbohydrazide were 45%, 5%, and 7%, respectively.

Further lab tests showed that field samples of boiler feed water (which contains approximately 500 parts per million of dissolved organics—including phenols and naphthenic acids) that is devoid of dissolved oxygen form foulant material under boiler conditions. Addition of small doses (>100 ppm) of polymerization inhibitor (in this case carbohydrazide) to the sample boiler feed water that is devoid of oxygen reduced fouling rate by 67%. In other examples 10 to 150 ppm of polymerization inhibitor have been used including 10, 20, 30, 50, 75, 100, 125, or 150 ppm of polymerization.

In some embodiments, the polymerization inhibitor includes the hydroxylamine with the following structure:

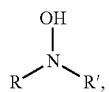

where R and R' are each hydrogen or carbon containing groups, such as an alkane or an alkene with 1 to 10 carbon atoms. Diethylhydroxylamine provides an example of a suitable hydroxylamine having the following structure:

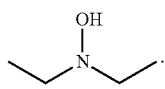

In some embodiments, the polymerization inhibitor includes the amino-urea with the following structure:

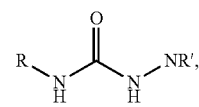

where R and R' are each hydrogen(s), or carbon containing groups, such as an alkane or an alkene with 1 to 10 carbon atoms and R may be a nitrogen containing group in the case of a di-amino-urea. Carbohydrazide provides an example of a suitable amino-urea having the following structure:

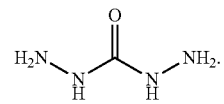

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method of generating steam, comprising:
    adding at least 10 parts per million of a polymerization inhibitor to feed water with a dissolved molecular oxygen and dissolved organic species, wherein a concentration of the dissolved molecular oxygen is less than one part per million, wherein said polymerization inhibitor inhibits coupling of said dissolved organic species; and
    supplying the feed water to a boiler for producing steam, with coupling of the dissolved organic species under boiler conditions limited by the polymerization inhibitor.

2. The method according to claim 1, wherein the polymerization inhibitor is selected from one of a hydroxylamine, an amino-urea, methyl-ethylketoxime, hydroquinone, and erythorbate.

3. The method according to claim 1, wherein the polymerization inhibitor is selected from one of a hydroxylamine and an amino-urea.

4. The method according to claim 1, wherein the polymerization inhibitor is diethylhydroxylamine.

5. The method according to claim 1, wherein the polymerization inhibitor reacts with one of an oxygen atom or a hydroxyl radical of the dissolved organic species to limit the coupling.

6. The method according to claim 1, wherein the polymerization inhibitor reacts with and breaks down said dissolved organic species to produce gases.

7. The method according to claim 1, further comprising injecting the steam into a well for assisting recovery of hydrocarbons.

8. The method according to claim 1, further comprising injecting the steam into a well for assisting recovery of hydrocarbons and separating the hydrocarbons from an aqueous phase forming the feed water with the dissolved organics species.

9. The method according to claim 1, wherein the polymerization inhibitor is added to the feed water that is devoid of dissolved molecular oxygen.

10. The method according to claim 1, wherein the boiler is a once-through steam generator.

11. A method of generating steam, comprising:
adding an oxygen scavenging agent to feed water;
adding at least 10 parts per million of a polymerization inhibitor different than the oxygen scavenging agent to the feed water containing dissolved organic species that are capable of coupling under boiler conditions, resulting in fouling deposition in the boiler without the polymerization inhibitor, wherein said polymerization inhibitor inhibits coupling of the dissolved organic species; and,
supplying the feed water with the added oxygen scavenging agent and the polymerization inhibitor to a boiler for producing the steam,
wherein the polymerization inhibitor is added to the feed water that is devoid of dissolved molecular oxygen.

12. The method according to claim 11, wherein the polymerization inhibitor is selected from one of a hydroxylamine, an amino-urea, methyl-ethylketoxime, hydroquinone, and erythorbate.

13. The method according to claim 11, wherein the polymerization inhibitor is selected from one of a hydroxylamine and an amino-urea.

14. The method according to claim 11, wherein the polymerization inhibitor is diethylhydroxylamine.

15. The method according to claim 11, wherein the polymerization inhibitor is carbohydrazide.

16. The method according to claim 11, wherein the polymerization inhibitor reacts with one of an oxygen atom or a hydroxyl radical of the dissolved organic species to limit the coupling of said dissolved organic species.

17. The method according to claim 11, wherein the polymerization inhibitor reacts with and breaks down dissolved organic species to produce gases.

18. The method according to claim 11, further comprising injecting the steam into a well for assisting recovery of hydrocarbons and separating the hydrocarbons from an aqueous phase forming the feed water with the dissolved organics species.

* * * * *